United States Patent
Burlet et al.

(10) Patent No.: US 7,446,697 B2
(45) Date of Patent: Nov. 4, 2008

(54) METHOD AND SYSTEM FOR CALIBRATING RADAR ALTIMETERS

(75) Inventors: Todd R. Burlet, Maple Grove, MN (US); Mark S. Shoemaker, Minneapolis, MN (US); Tom A. Petricka, Northfield, MN (US); Clayton A. Yares, Circle Pines, MN (US)

(73) Assignee: Honeywell International Inc., Morristown, NJ (US)

( * ) Notice: Subject to any disclaimer, the term of this patent is extended or adjusted under 35 U.S.C. 154(b) by 107 days.

(21) Appl. No.: 11/623,422

(22) Filed: Jan. 16, 2007

(65) Prior Publication Data

US 2008/0238763 A1    Oct. 2, 2008

(51) Int. Cl.
  *G01S 7/40* (2006.01)
  *G01S 13/08* (2006.01)
(52) U.S. Cl. .............. 342/120; 342/121; 342/173; 342/174
(58) Field of Classification Search ......... 342/120–122, 342/165, 173, 174
See application file for complete search history.

(56) References Cited

U.S. PATENT DOCUMENTS

| | | | | |
|---|---|---|---|---|
| 3,340,529 | A | * | 9/1967 | Blitz .......................... 342/122 |
| 3,341,849 | A | * | 9/1967 | Cordry et al. ................ 342/89 |
| 7,239,266 | B2 | * | 7/2007 | Vacanti ....................... 342/120 |
| 2006/0212257 | A1 | * | 9/2006 | Makela et al. ............... 702/138 |

OTHER PUBLICATIONS

Honeywell International Inc., "The HG7808 Radar Altimeter Module", Jun. 13, 2003, 2 pgs., Publisher: Honeywell International Inc.

* cited by examiner

*Primary Examiner*—John B Sotomayor
(74) *Attorney, Agent, or Firm*—Fogg & Powers LLC

(57) ABSTRACT

A method for calibrating an altimeter is disclosed. The method comprises monitoring signal strength of one or more altitude measurements. Based on the signal strength, the method applies piecewise linear altitude correction to the one or more altitude measurements to generate altitude correction data. The method further determines a goodness-of-fit for the altitude correction data. The altitude correction data maintains a correct altitude measurement in the presence of variable signal strength.

20 Claims, 6 Drawing Sheets

US 7,446,697 B2

METHOD AND SYSTEM FOR CALIBRATING RADAR ALTIMETERS

BACKGROUND

Reliable navigation systems have always been essential for estimating position during flight. For example, traditional altimeter measurements determine the altitude of an aircraft above a fixed level by measuring air pressure (where air pressure decreases with an increase of altitude). A radar altimeter measures altitude by using the time for a radio signal to reflect from a surface (terrain) back to the aircraft. For example, the radar altimeter measures exact height during landing and when the aircraft (in particular, a rotary-wing aircraft) is in a "hover" mode. Radar altimeters are typically included as a component in various avionics and positioning systems. In each system, the radar altimeter component informs an operator (pilot) that the aircraft is flying too low or that terrain is rising to meet the aircraft.

Traditional radar altimeters use a closed-loop gain control to improve altitude accuracy. Any reductions in radar signal strength (that is, attenuation of the radar signal) limits the gain control and directly impacts altitude measurement accuracy. Several factors are typically analyzed to correct this reduction in signal strength, including ambient temperature, terrain conditions and aircraft altitudes. Maintaining proper signal strength levels is essential for accurate and reliable altitude measurement processing.

SUMMARY

The present invention is related to a method and system for calibrating radar altimeters. Particularly, in one embodiment, a method for calibrating an altimeter is provided. The method comprises monitoring signal strength of one or more altitude measurements. Based on the signal strength, the method applies piecewise linear altitude correction to the one or more altitude measurements to generate altitude correction data. The method further determines a goodness-of-fit for the altitude correction data. The altitude correction data maintains a correct altitude measurement in the presence of variable signal strength.

DRAWINGS

These and other features, aspects, and advantages will be understood with regard to the following description, appended claims, and accompanying drawings where:

DETAILED DESCRIPTION

The present invention generally relates to a method and system for calibrating radar altimeters using piecewise linear altitude correction. Advantageously, the piecewise linear altitude correction improves altitude measurement accuracy for radar altimeters based on raw altitude error detection. The piecewise linear altitude correction processes raw altitude (and corresponding ambient temperature) measurement data and determines a multiple segment linear fit for the raw altitude measurement data. From the linear fit, the calibration system determines one or more integer correction coefficients to apply to the raw altitude measurement data. The one or more integer correction coefficients are used in radar altimeters to improve the altitude measurement accuracy by maintaining correct altitude measurements in the presence of variable signal strength.

Figure 1:
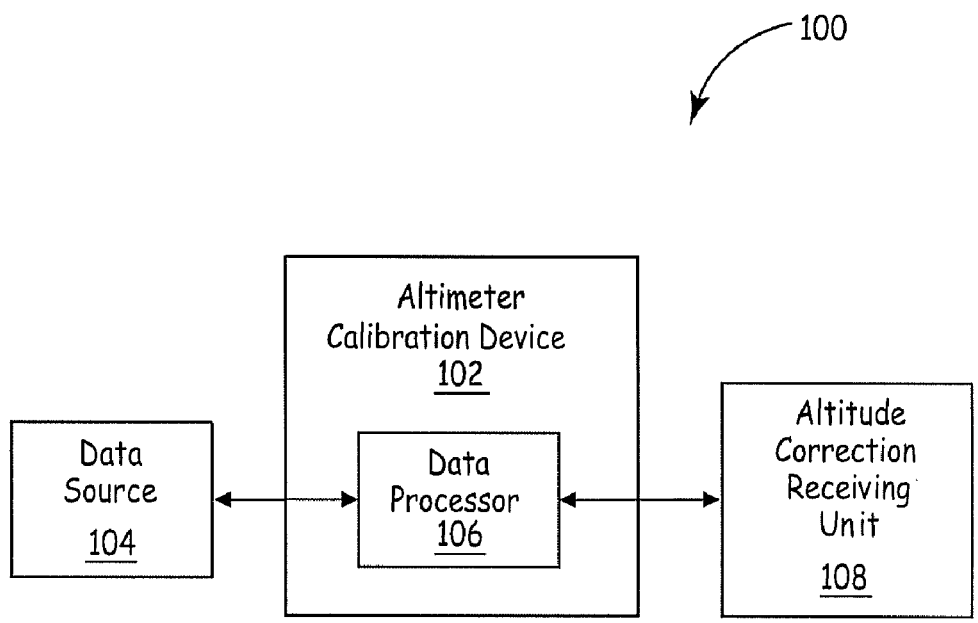
FIG. 1 is a block diagram illustrating an embodiment of an altimeter calibration system.

FIG. 1 illustrates one embodiment of an altimeter calibration system 100. The system 100 comprises an altimeter calibration device 102, a data source 104, and an altitude correction receiving unit (ACRU) 108. The altimeter calibration device 102 further includes a data processor 106. The ACRU 108 receives altitude correction coefficients from the data processor 106. The data processor 106 processes at least one of real time or simulated altitude measurements from the data source 104. The data processor 106 can be at least one of a microcontroller, an application-specific integrated circuit (ASIC), a field-programmable gate array (FPGA), a field-programmable object array (FPOA), or a programmable logic device (PLD). In the example embodiment of FIG. 1, the ACRU 108 and the data source 104 are external to the altimeter calibration device 102.

The data processor 106 generates the altitude correction coefficients using piecewise linear altitude correction over at least three segments of a continuous stream of the real time altitude measurements from the data source 104. In one implementation, the real time altitude measurements are simulated radar altimeter measurements. In order to maintain signal strength of the real time (simulated) altitude measurements, the altimeter calibration device 102 attenuates the altitude measurements until the data processor 106 indicates that the signal strength of the real time (simulated) altitude measurements is at (that is, reaches) a prescribed signal reliability threshold level. In the example embodiment of FIG. 1, one or more of the real time (simulated) altitude measurements from the data source 104 that reside substantially outside goodness-of-fit standards are discarded by the altimeter calibration device 102. The goodness-of-fit standards indicate how well the real time (simulated) altitude measurements from the data source 104 fit a set of prescribed observations in the data processor 106 for the piecewise linear altitude correction of the system 100. The goodness-of-fit standards used in the system 100 summarize discrepancies between observed altitude measurement values in the altimeter calibration device 102 and the altitude measurements expected from the ACRU 108.

In operation, the data processor 106 records altitude measurement data from the data source 104 for a plurality of predetermined altitudes and corresponding ambient temperatures in real time. The data processor 106 continually monitors signal strength of the altitude measurement data at one or more levels of attenuation (as described in further detail below with respect to FIGS. 2 and 3). The data processor 106 processes the altitude measurement data to determine a piecewise linear fit over multiple (that is, at least three) segments fit of the altitude measurement data. The data processor 106 converts raw altitude readings in the altitude measurement data from altitude to altitude error to determine actual altitude errors for the at least three segment piecewise linear fit. As discussed above, the data processor 106 performs the goodness-of-fit calculation on corrected altitude measurement errors to complete the at least three segment piecewise linear fit. From the linear fit, the data processor 106 determines a plurality of integer correction coefficients for future radar altimeter altitude measurements in, without limitation, the ACRU 108, and one or more types of electronic radar altimeters. The data processor 106 generates the plurality of integer correction coefficients for an altitude correction routine that substantially improve altimeter measurement accuracy. The altitude correction routine compensates for decreases in altimeter measurement signal strength in the presence of variable signal strength.

Figure 2:
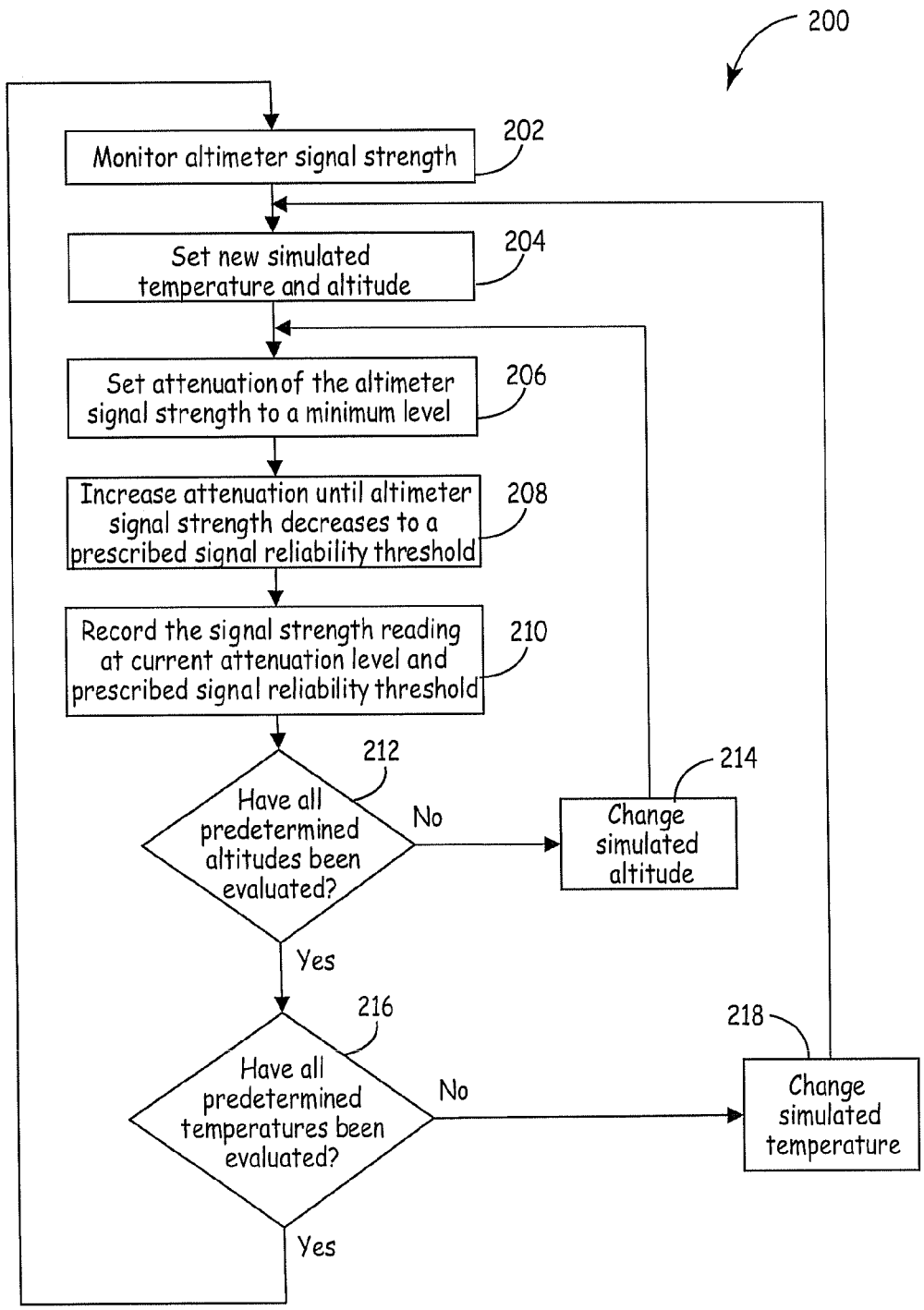
FIG. 2 is a flow diagram illustrating an embodiment of processing altimeter signal data in the altimeter calibration system of FIG. 1.

FIG. 2 is a flow diagram illustrating a method 200 for processing altimeter signal data in the altimeter calibration system 100. The method of FIG. 2 starts at block 202. The method 200 addresses monitoring altimeter signal strength during real time (simulated) altitude data collection from the data source 104. At block 202, the altimeter calibration device 102 monitors altimeter signal strength from the data source 104. At block 204, the altimeter calibration device 102 sets a new simulated altitude and corresponding ambient temperature for the data processor 106 to monitor. The altimeter calibration device 102 attenuates the altimeter signal strength at a minimum altitude signal attenuation level at block 206. At block 208, the altimeter calibration device 102 increases the altitude signal attenuation until the data processor 106 indicates the altimeter signal strength decreases to a prescribed signal reliability threshold level. Once the altimeter signal strength reaches the prescribed signal reliability threshold level, the altimeter signal strength is recorded at the current attenuation level (block 210) in the altimeter calibration device 102 for further processing (as illustrated in further detail below with respect to FIG. 3). Until all predetermined altitudes have been evaluated (block 212), the data processor 106 requests a different (that is, the next) simulated altitude value from the data source 104 at block 214. In a similar manner, the data processor 106 requests a different (that is, the next) simulated corresponding ambient temperature value from the data source 104 at block 218 until all predetermined corresponding ambient temperatures have been evaluated at block 216. In the example embodiment of FIG. 2, the altimeter calibration system 100 can be placed in a temperature chamber (not shown). The temperature chamber generates each simulated ambient temperature evaluated by the data processor 106.

Figure 3:
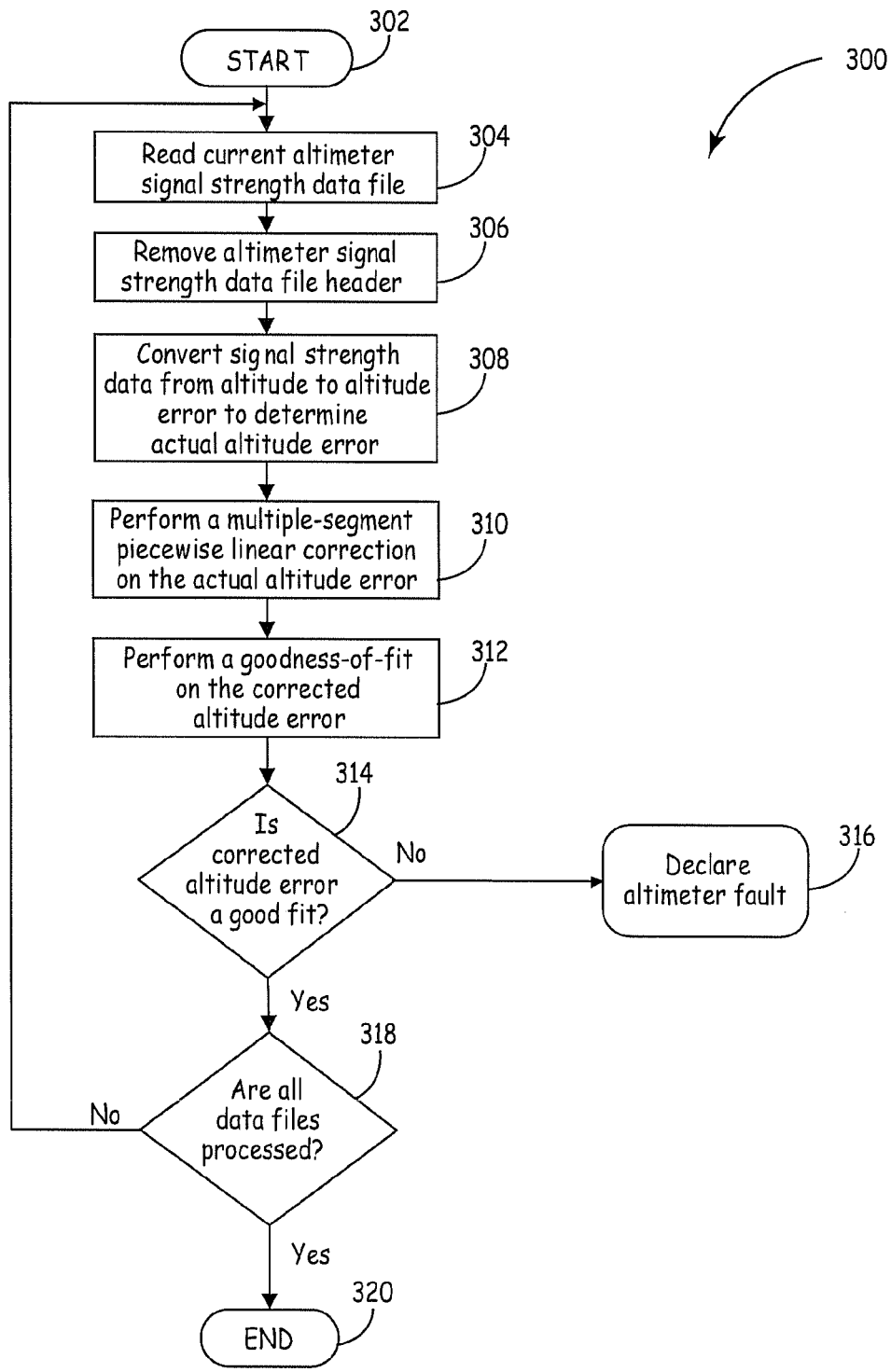
FIG. 3 is a flow diagram illustrating an embodiment of a method for calibrating a radar altimeter using the altimeter calibration system of FIG. 1.

FIG. 3 is a flow diagram illustrating a method 300 for calibrating a radar altimeter using the altimeter calibration system 100. The method of FIG. 3 starts at block 302. The method 300 addresses applying piecewise linear altitude correction to the one or more attenuated altimeter signal data measurements stored at block 210 in the method 200 (FIG. 2). From the corrected measurements, the method 300 determines a goodness-of-fit for the altitude correction data in the ACRU 108.

At block 304, the data processor 106 reads in a current altimeter signal strength data file containing attenuated altimeter measurement data from the altimeter calibration device 102. At block 306, the data processor 106 removes a data file header from the current signal strength data file before converting altitude (within the current altimeter signal strength data file) to altitude error at block 308. The conversion to altitude error provides the data processor 106 with actual altitude error of the attenuated altimeter measurement data from the altimeter calibration device 102. At block 310, a multiple segment piecewise linear correction (discussed in further detail below with respect to FIGS. 6 and 7) is performed on the actual altitude error prior to a goodness-of-fit on the corrected altitude error at block 312. If the corrected altitude error is not a good fit (block 314), an altimeter fault is declared to the altimeter calibration device 102 at block 316. The method 300 continues until all data files are processed (blocks 318, 320).

Figure 4:
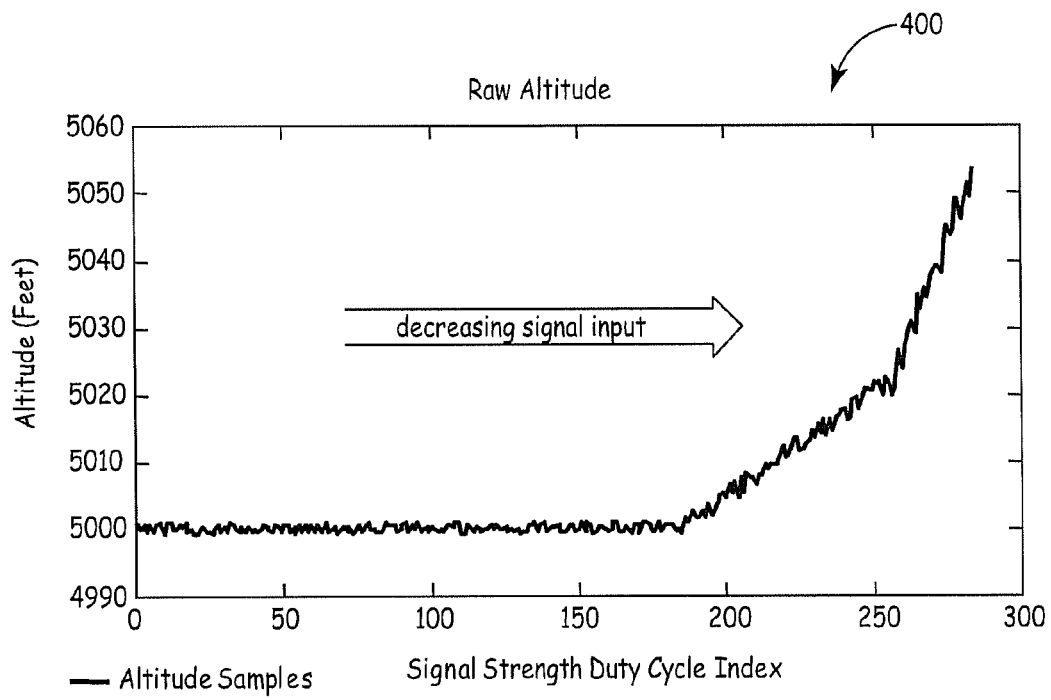
FIG. 4 is a graph illustrating an example of raw altitude recorded in the altitude calibration system of FIG. 1.
Figure 5:
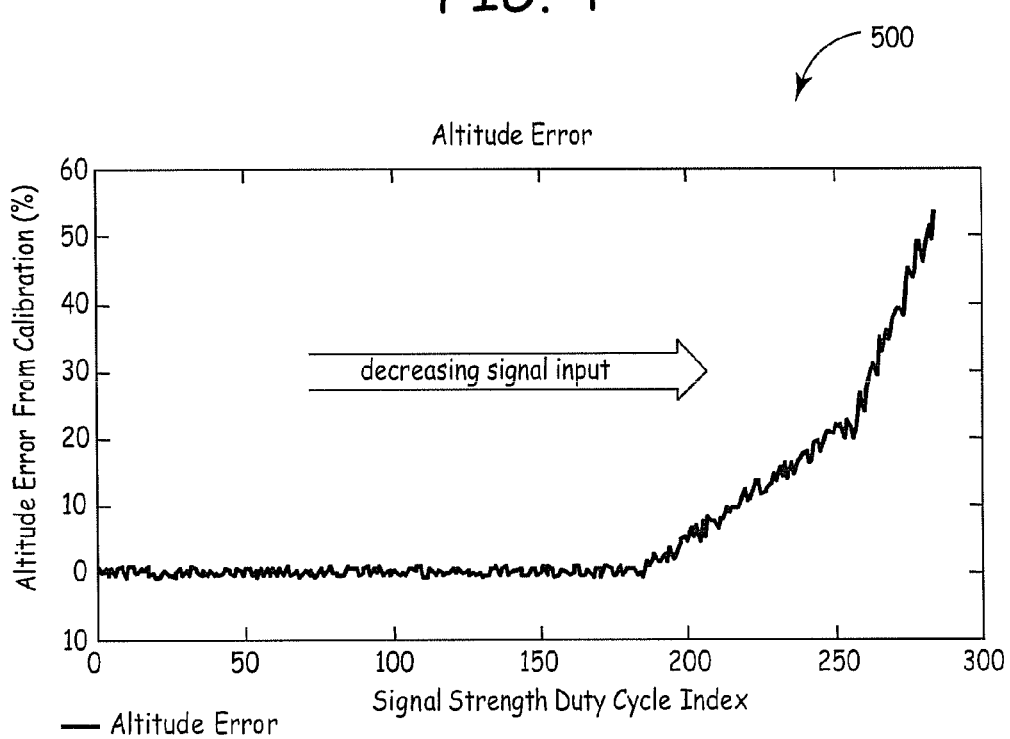
FIG. 5 is a graph illustrating an example of altitude error recorded in the altitude calibration system of FIG. 1.

FIGS. 4 and 5 are graphs 400 and 500 illustrating examples of raw altitude and altitude error, respectively, recorded in the altitude calibration system 100. The graph 400 illustrates raw altitude samples taken from the data source 104, plotted in terms of a signal strength duty cycle index (that is, a ratio of working time to total time for the altitude signal to be measured by the altimeter calibration device 102) vs. altitude. As shown in FIG. 4, as the altitude signal strength from the data source 104 varies (that is, attenuation of the altitude signal input increases), the signal strength duty cycle index increases. The graph 500 illustrates the altitude samples of the graph 400 converted to altitude errors by subtracting the actual altitude (as discussed above in the method 300 of FIG. 3). The altitude error plotted in FIG. 5 is the actual error (an error plot) corrected by the three-segment piecewise least squares fit method of block 310 (FIG. 3).

Figure 6:
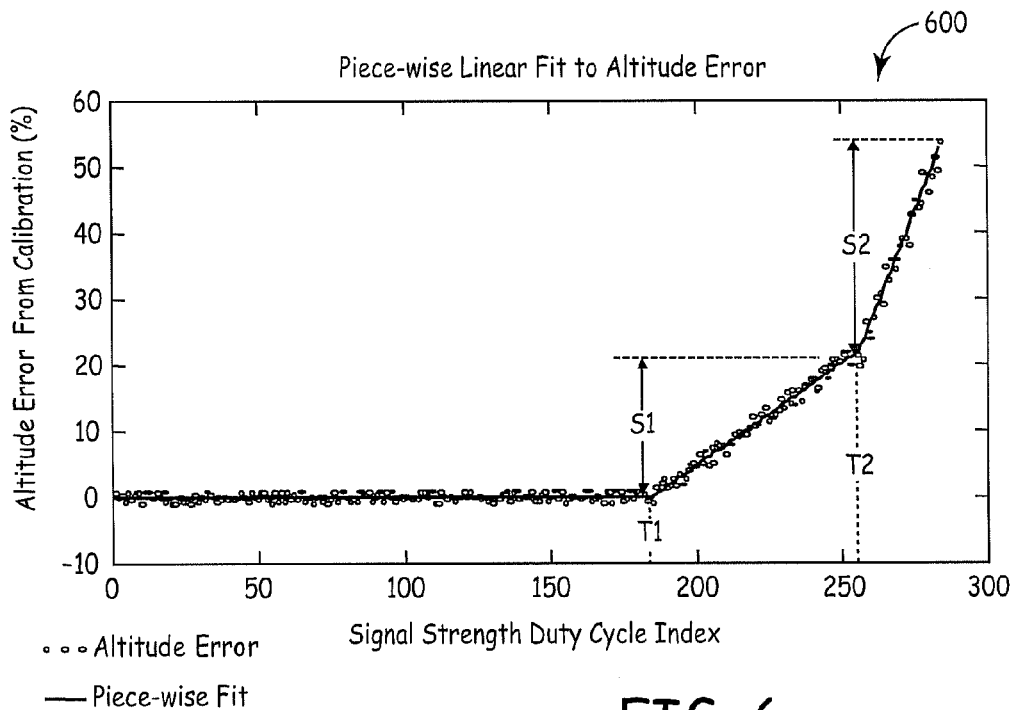
FIG. 6 is a graph illustrating an example of applying a piecewise linear fit to altitude error recorded in the altimeter calibration system of FIG. 1.
Figure 7:
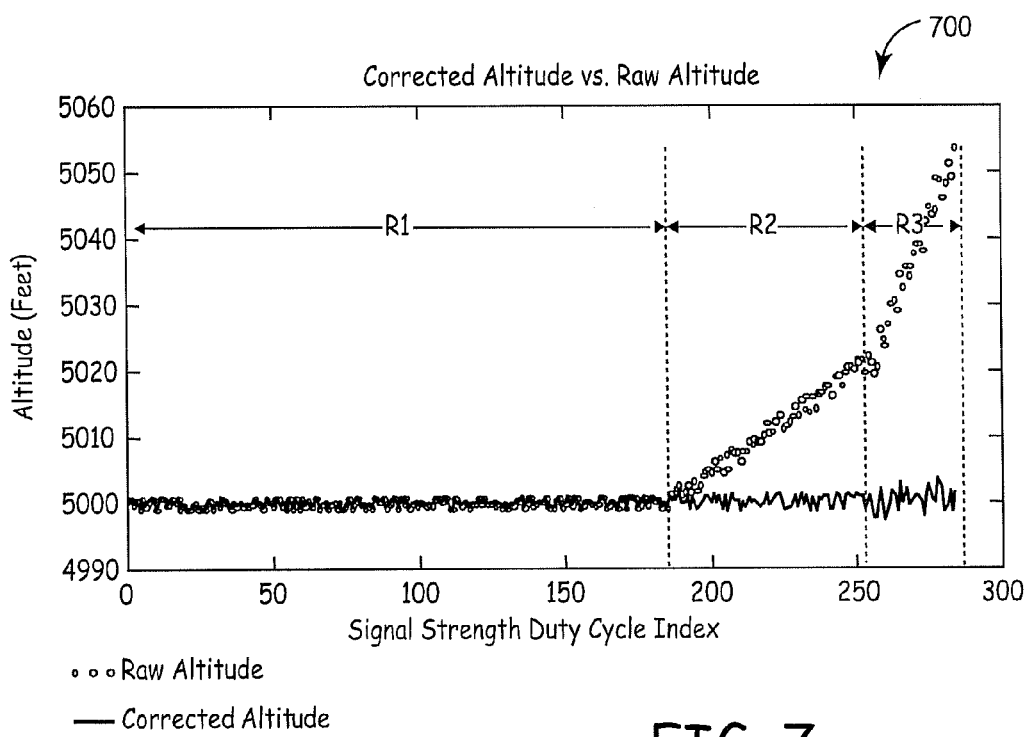
FIG. 7 is a graph illustrating an example of corrected altitude vs. raw altitude measurements recorded in the altimeter calibration system of FIG. 1.

FIG. 6 is a graph 600 illustrating an example of applying a piecewise linear fit to altitude error recorded in the altimeter calibration system 100. FIG. 7 is a graph 700 illustrating an example of corrected altitude vs. raw altitude measurements recorded in the altimeter calibration system 100. The graphs 600 and 700 further illustrate separating the actual altitude error of FIG. 5 above into at least three segments based on the shape of the altitude error plot in the graph 600. To determine the piecewise linear fit, the graph 700 divides the altitude error plot from the graph 600 into at least three regions: R1, R2, and R3. For region R1, the altitude error plot does not deviate away from the zero baseline of the graph 600 until reaching breakpoint T1. For region R1, the piecewise linear altitude correction (Correction) is not applied (that is, Correction=0). In region R2, the error plot deviates from the zero baseline of graph 600 until reaching breakpoint T2. For region R2, the piecewise linear altitude correction is calculated as illustrated below in Equation 1:

$$\text{Correction} = \frac{SS - T1}{T2 - T1} * S1 \quad \text{(Equation 1)}$$

With respect to Equation 1 above, SS represents the signal strength and S1 represents the altitude error from calibration at the breakpoint T2 where $T1 \leq SS \leq T2$. In region R3, the error plot deviates from the breakpoint T2 of graph 600 until reaching a maximum signal strength altitude error as shown in FIG. 6. For region R3, the piecewise linear altitude correction is calculated as illustrated below in Equation 2:

$$\text{Correction} = \frac{SS - T2}{MaxSS - T2} * S2 + S1 \quad \text{(Equation 2)}$$

With respect to Equation 2 above, MaxSS represents the maximum signal strength altitude error and S1 represents the altitude error from calibration at breakpoint T2, where T2≦SS. The piecewise linear altitude correction values calculated in Equations 1 and 2 are used by the ACRU 108 to correct altitude and signal strength errors as shown by the corrected altitude plot values in graph 700.

The application of piecewise linear altitude correction in the altitude calibration system 100 described above with respect to FIGS. 6 and 7 addresses at least one method for calibrating a radar altimeter. The altimeter calibration of system 100 monitors signal strength of one or more altitude measurements from the data source 104 by regulating the signal strength of the one or more altitude measurements using the altimeter calibration system 100. The system 100 configures a plurality of gain control adjustment variables, including, but not limited to, ambient temperature and altitude from the data source 104. The altimeter calibration device 102 attenuates the one or more altitude measurements until the signal strength of the one or more altitude measurements reaches the prescribed signal reliability threshold level discussed above with respect to FIGS. 1 and 2. The altimeter calibration device 102 records the attenuated altitude measurements for further processing by the data processor 106.

The data processor 106 applies the piecewise linear altitude correction to the one or more altitude measurements and from the corrected altitude measurements, the data processor 106 determines the goodness-of-fit for the altitude correction data. In one implementation, the data processor 106 collects the one or more altitude measurements at a plurality of predetermined ambient temperatures and altitudes in real time from the data source 104. From the goodness-of-fit determination, the data processor 106 calculates a plurality of integer correction coefficients for further altitude measurement correction as further discussed below with respect to FIG. 8.

Figure 8:
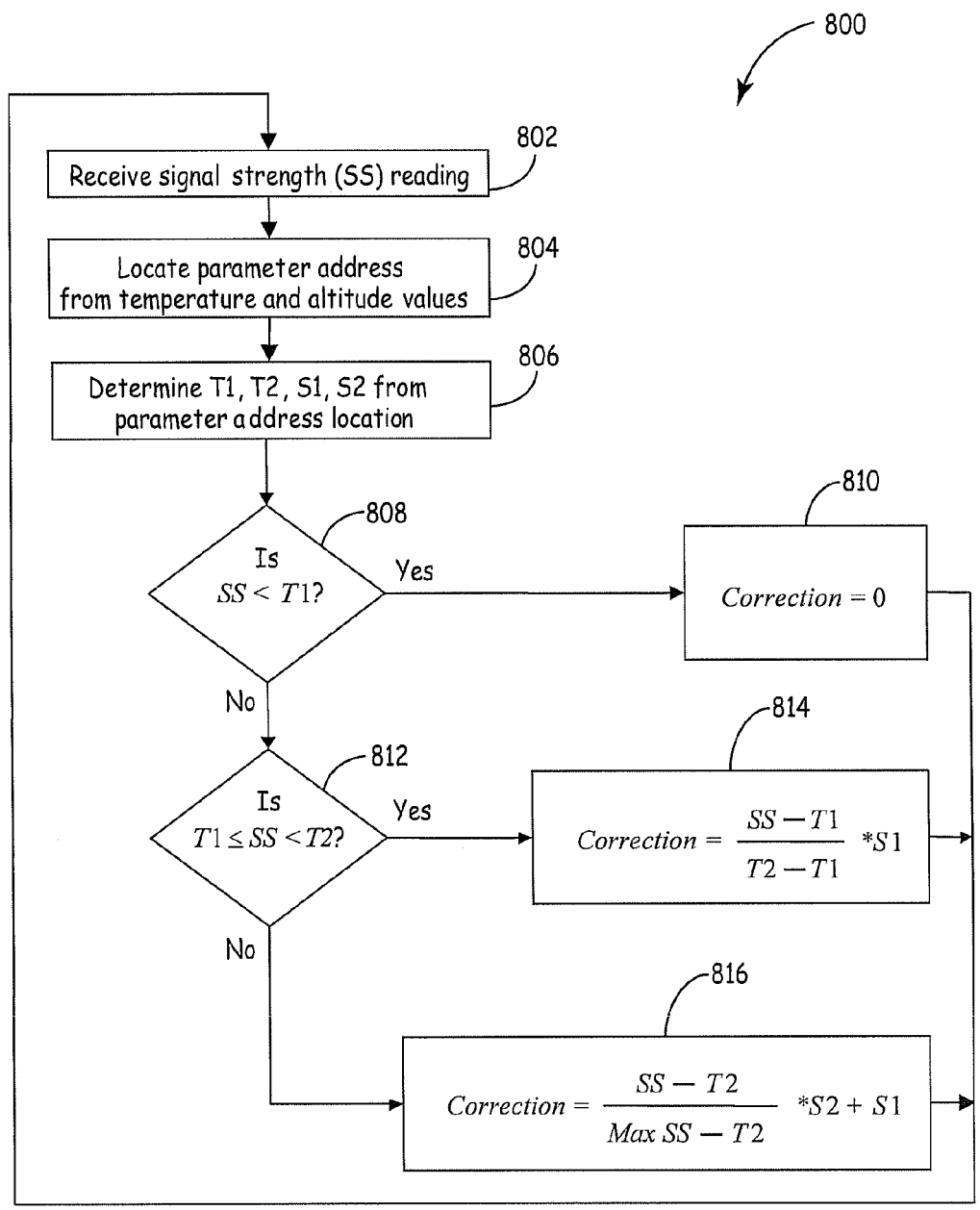
FIG. 8 is a flow diagram illustrating an embodiment of a method used by an altimeter for employing the method of FIG. 3 during altimeter calibration.

FIG. 8 is a flow diagram illustrating a method 800 used by an altimeter for employing the method 300 during altimeter calibration. The method of FIG. 8 starts at block 802. The method 800 addresses applying the altitude correction data of the method 300 using the piecewise linear altitude correction illustrated above with respect to FIGS. 4 to 7. At block 802, the ACRU 108 receives one or more signal strength (SS) readings from the altimeter calibration device 102. At block 804, the ACRU 108 locates at least one parameter address from ambient temperature and altitude values provided by the altimeter calibration device 102. In one implementation, parameter addresses are stored in a memory lookup table in the ACRU 108. From a memory location specified by the parameter address, the parameters T1, T2, S1, and S2 (calculated as described above with respect to FIG. 7) are read by the ACRU 108 at block 806. If the SS reading is less than the value of T1 (block 808), then no piecewise linear altitude correction is applied to the signal strength reading at block 810. If the value of T1≦the SS reading and the SS readings are <T2 (block 812), then the piecewise linear altitude correction of Equation 1 is applied to the signal strength reading at block 814. If the signal strength reading exceeds T2, the piecewise linear altitude correction of Equation 2 is applied to the signal strength reading at block 816.

The methods and techniques described herein may be implemented in a combination of digital electronic circuitry and software (or firmware) residing in a programmable processor (for example, a special-purpose processor or a general-purpose processor in a computer). An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM).

Storage media suitable for tangibly embodying computer program instructions and data include all forms of non-volatile memory, and including by way of example, semiconductor memory devices; read-only memory and flash memory devices; magnetic disks such as internal hard disks and removable disks; magneto-optical disks; optical disks such as compact disks (CDs), digital video disks (DVDs), and the like; nonvolatile ROM, RAM, and other like media; or other computer readable media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The methods of the invention can be implemented by computer executable instructions, such as program modules, which are executed by a processor. Generally, program modules include routines, programs, objects, data components, data structures, algorithms, etc. that perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

This description has been presented for purposes of illustration, and is not intended to be exhaustive or limited to the embodiments disclosed. Variations and modifications may occur, which fall within the scope of the embodiments described above, as set forth in the following claims.

What is claimed is:

1. A method for calibrating an altimeter, the method comprising:
monitoring signal strength of one or more altitude measurements;
based on the signal strength, applying piecewise linear altitude correction to the one or more altitude measurements to generate altitude correction data; and
determining a goodness-of-fit for the altitude correction data;
wherein the altitude correction data maintains a correct altitude measurement in the presence of variable signal strength.

2. The method of claim 1, wherein monitoring the signal strength comprises regulating the signal strength of the one or more altitude measurements using an altimeter calibration system.

3. The method of claim 2, wherein regulating the signal strength of the one or more altitude measurements comprises configuring a plurality of gain control adjustment variables within the altimeter calibration system.

4. The method of claim 3, wherein configuring the plurality of gain control adjustment variables further comprises attenuating the one or more altitude measurements until the signal strength of the one or more altitude measurements reaches a prescribed signal reliability threshold.

5. The method of claim 1, wherein applying the piecewise linear altitude correction further comprises collecting the one or more altitude measurements at a plurality of predetermined altitudes and temperatures in real time.

6. The method of claim 5, wherein collecting the one or more altitude measurements further comprises calculating a plurality of integer correction coefficients for further altitude measurement correction.

7. The method of claim 1, wherein determining the goodness-of-fit comprises discarding one or more of the altitude measurements that reside substantially outside a goodness-of-fit standard for the piecewise linear altitude correction.

8. A method for calibrating an altimeter, the method comprising:
   monitoring altimeter signal strength;
   setting one or more simulated altitudes and corresponding temperatures;
   setting attenuation of the altimeter signal strength at a minimum level;
   increasing the attenuation until the altimeter signal strength decreases to a prescribed signal reliability threshold;
   recording the altimeter signal strength at the prescribed signal reliability threshold in one or more data files;
   reading the altimeter signal strength in the one or more data files;
   converting the altimeter signal strength from the one or more data files from an altitude to an altitude error to determine actual altitude error;
   performing a multiple-segment piecewise linear correction on the actual altitude error;
   performing a goodness-of-fit on the corrected actual altitude error; and
   determining whether the corrected actual altitude error is a good fit.

9. A computer readable medium having executable instructions for performing a method for calibrating an altimeter according to claim 8.

10. An altimeter calibration system, comprising:
    at least one altimeter calibration device including a data processor;
    an altitude correction receiving unit in operative communication with the data processor; and
    a data source in operative communication with the data processor;
    wherein the data processor comprises program instructions that:
    record altimeter measurement data from the data source for a plurality of predetermined altitudes and corresponding ambient temperatures in real time;
    process the altimeter measurement data to determine a piecewise linear correction over multiple segments of the altimeter measurement data; and
    from the linear correction, determine a plurality of integer correction coefficients for future altitude measurements.

11. The system of claim 10, wherein the program instructions that record the altimeter measurement data cause the data processor to continually monitor signal strength of the altimeter measurement data at one or more levels of attenuation.

12. The system of claim 10, wherein the program instructions that process the altimeter measurement data to determine the multiple segment piecewise linear correction cause the data processor to convert raw altitude readings in the altimeter measurement data from altitude to altitude error to determine actual altitude errors for the multiple segment piecewise linear correction.

13. The system of claim 12, wherein the program instructions that process the altimeter measurement data to determine the multiple segment piecewise linear correction cause the data processor to perform a goodness-of-fit calculation on the actual altitude errors over at least three segments of the altimeter measurement data.

14. The system of claim 10, wherein the program instructions that determine the plurality of integer correction coefficients cause the data processor to generate the plurality of integer correction coefficients for an altitude correction routine that compensates for decreases in altimeter measurement signal strength.

15. The system of claim 10, wherein the real time altimeter measurement data comprises simulated radar altimeter measurements.

16. The system of claim 10, wherein the data processor is at least one of a microcontroller, an application-specific integrated circuit, a field-programmable gate array, a field-programmable object array, or a programmable logic device.

17. The system of claim 10, wherein the real time altimeter measurement data is attenuated until the data processor indicates that signal strength of the real time altimeter measurement data reaches a prescribed signal reliability threshold.

18. The system of claim 10, wherein the data processor is responsive to at least one of signal strength and gain control of the real time altimeter measurement data at a plurality of altitudes and corresponding ambient temperatures.

19. The system of claim 10, wherein the integer correction coefficients are used to compensate for decreases in altimeter measurement signal strength.

20. The system of claim 10, wherein the program instructions further comprise:
    a data collecting module operative to:
      monitor altimeter signal strength;
      set one or more simulated altitudes and corresponding temperatures;
      set attenuation of the altimeter signal strength at a minimum level;
      increase the attenuation until the altimeter signal strength decreases to a prescribed signal reliability threshold; and
      record the altimeter signal strength at the prescribed signal reliability threshold in one or more data files; and
    a data processing module operative to:
      read the altimeter signal strength in the one or more data files;
      convert the altimeter signal strength from the one or more data files from altitude to an altitude error to determine actual altitude error;
      perform the multiple-segment piecewise linear correction on the actual altitude error;
      perform a goodness-of-fit on the corrected actual altitude error; and
      determine whether the corrected actual altitude error is a good fit.

* * * * *